(12) United States Patent
Kim

(10) Patent No.: US 12,347,450 B2
(45) Date of Patent: Jul. 1, 2025

(54) VOICE PROCESSING DEVICE AND OPERATING METHOD THEREFOR

(71) Applicant: AMOSENSE CO., LTD., Cheonan-si (KR)

(72) Inventor: Jungmin Kim, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 262 days.

(21) Appl. No.: 18/028,175

(22) PCT Filed: Sep. 24, 2021

(86) PCT No.: PCT/KR2021/012991
§ 371 (c)(1),
(2) Date: Mar. 23, 2023

(87) PCT Pub. No.: WO2022/065891
PCT Pub. Date: Mar. 31, 2022

(65) Prior Publication Data
US 2023/0377592 A1    Nov. 23, 2023

(30) Foreign Application Priority Data

Sep. 25, 2020  (KR) ......................... 10-2020-0125022
Sep. 25, 2020  (KR) ......................... 10-2020-0125025

(51) Int. Cl.
*G10L 21/0272* (2013.01)
*G10L 15/00* (2013.01)
*H04R 5/027* (2006.01)

(52) U.S. Cl.
CPC ........ *G10L 21/0272* (2013.01); *G10L 15/005* (2013.01); *H04R 5/027* (2013.01); *H04R 2499/13* (2013.01)

(58) Field of Classification Search
CPC ... G10L 21/0272; G10L 15/005; H04R 5/027; H04R 2499/13; H04R 5/04; H04R 1/406;
(Continued)

(56) References Cited

U.S. PATENT DOCUMENTS 9,749,738 B1* 8/2017 Adsumilli ............. H04R 3/005
9,981,617 B1* 5/2018 MacDonald ........ F02D 41/3005
(Continued)

FOREIGN PATENT DOCUMENTS

KR      10-1178801 B1     8/2012
KR   10-2019-0005617 A    1/2019
(Continued)

*Primary Examiner* — Thuykhanh Le
(74) *Attorney, Agent, or Firm* — Maschoff Brennan

(57) ABSTRACT

A voice processing device is disclosed. The voice processing device comprises: a voice processing circuit configured to generate an isolated voice signal associated with respective voices spoken at a plurality of sound source locations in a vehicle by isolating, and output an interpretation result for the respective voices on the basis of the isolated voice signal; a memory configured to store source language information indicating a source language and target language information indicating a target language in order to interpret the voice associated with the isolation voice signal; and a communication circuit configured to output the interpretation result, wherein the voice processing circuit generates the interpretation result in which the language of the voice corresponding to the isolated voice signal is interpreted from the source language into the target language.

11 Claims, 11 Drawing Sheets

(58) Field of Classification Search
CPC .... H04R 5/023; H04R 2430/20; H04R 3/005; G01S 3/808; G06F 3/16; G06F 40/58
USPC .......................................................... 704/200
See application file for complete search history.

(56) References Cited

U.S. PATENT DOCUMENTS

| | | | | |
|---|---|---|---|---|
| 10,491,998 | B1* | 11/2019 | Kominar | H04R 3/12 |
| 11,397,280 | B2* | 7/2022 | Nishimura | G06F 16/90335 |
| 11,710,399 | B1* | 7/2023 | Rothenberg | G08G 1/143 |
| | | | | 340/988 |
| 11,900,072 | B1* | 2/2024 | Bossio | G06F 3/04883 |
| 2002/0019213 | A1* | 2/2002 | Yoshinori | B60H 1/00742 |
| | | | | 454/155 |
| 2005/0267647 | A1* | 12/2005 | Kamdar | G06F 40/58 |
| | | | | 701/1 |
| 2007/0242834 | A1* | 10/2007 | Coutinho | H04R 5/04 |
| | | | | 381/71.8 |
| 2008/0318518 | A1* | 12/2008 | Coutinho | H04H 20/62 |
| | | | | 455/3.06 |
| 2010/0070274 | A1 | 3/2010 | Cho et al. | |
| 2012/0035923 | A1* | 2/2012 | Krause | H04L 51/214 |
| | | | | 704/235 |
| 2013/0154852 | A1* | 6/2013 | Kim | B60Q 5/006 |
| | | | | 340/904 |
| 2014/0198933 | A1* | 7/2014 | Totsuka | G06V 20/56 |
| | | | | 381/302 |
| 2014/0206308 | A1* | 7/2014 | Hatton | H04W 4/90 |
| | | | | 455/404.1 |
| 2014/0365126 | A1* | 12/2014 | Vulcano | G01C 21/3679 |
| | | | | 701/538 |
| 2015/0105976 | A1* | 4/2015 | Shikii | B60W 40/08 |
| | | | | 701/36 |
| 2015/0154957 | A1* | 6/2015 | Nakadai | G10L 15/26 |
| | | | | 704/235 |
| 2015/0189438 | A1* | 7/2015 | Hampiholi | H04S 3/002 |
| | | | | 381/80 |
| 2015/0204965 | A1* | 7/2015 | Magarida | G01S 5/26 |
| | | | | 367/117 |
| 2015/0210214 | A1* | 7/2015 | Hellaker | B60Q 9/00 |
| | | | | 381/86 |
| 2015/0347399 | A1* | 12/2015 | Aue | H04M 3/42 |
| | | | | 704/2 |
| 2016/0097928 | A1* | 4/2016 | Muramatsu | B60K 35/00 |
| | | | | 345/7 |
| 2016/0165031 | A1* | 6/2016 | Gopinath | H04W 8/005 |
| | | | | 455/569.2 |
| 2016/0336008 | A1 | 11/2016 | Menezes et al. | |
| 2016/0350286 | A1* | 12/2016 | Murthy | G06V 20/63 |
| 2017/0270080 | A1* | 9/2017 | Sakamoto | G06F 40/106 |
| 2017/0315990 | A1* | 11/2017 | Kawana | G06F 40/58 |
| 2017/0317706 | A1* | 11/2017 | Kudo | H04R 1/40 |
| 2018/0063632 | A1* | 3/2018 | Wheeler | H04R 1/2811 |
| 2018/0124515 | A1* | 5/2018 | Lopez | G06F 3/165 |
| 2018/0137103 | A1* | 5/2018 | Watson | G09B 21/006 |
| 2018/0314689 | A1* | 11/2018 | Wang | G10L 15/1822 |
| 2018/0319333 | A1* | 11/2018 | Schindele | H04R 1/025 |
| 2019/0018411 | A1* | 1/2019 | Herbach | G06T 11/60 |
| 2019/0035418 | A1* | 1/2019 | Takashima | G10L 21/0272 |
| 2019/0045319 | A1* | 2/2019 | Hotary | G06V 20/59 |
| 2019/0180758 | A1* | 6/2019 | Washio | G10L 15/26 |
| 2019/0251973 | A1* | 8/2019 | Kume | G06F 3/167 |
| 2019/0315227 | A1* | 10/2019 | Kim | G06V 20/597 |
| 2020/0035249 | A1 | 1/2020 | Choi et al. | |
| 2020/0189501 | A1* | 6/2020 | Kim | G10L 15/07 |
| 2020/0193817 | A1* | 6/2020 | Hwang | B60K 31/0008 |
| 2020/0202884 | A1* | 6/2020 | Phan Le | H04W 4/02 |
| 2020/0349949 | A1* | 11/2020 | Yoshioka | H04L 65/403 |
| 2020/0349953 | A1* | 11/2020 | Qin | G10L 15/26 |
| 2020/0349954 | A1* | 11/2020 | Yoshioka | G10L 15/30 |
| 2021/0001781 | A1* | 1/2021 | Hwang | H04R 25/558 |
| 2021/0133290 | A1* | 5/2021 | Makke | G10L 15/22 |
| 2021/0204059 | A1* | 7/2021 | Trestain | H04R 3/005 |
| 2021/0248994 | A1* | 8/2021 | Hori | G06F 3/167 |
| 2021/0306789 | A1* | 9/2021 | Noguchi | H04R 1/403 |
| 2021/0345043 | A1* | 11/2021 | Trestain | H04R 3/02 |
| 2022/0277744 | A1* | 9/2022 | Mohammad | G10L 25/84 |
| 2023/0173921 | A1* | 6/2023 | Ushio | B60K 35/10 |
| | | | | 701/36 |
| 2023/0186036 | A1* | 6/2023 | Choi | G10L 21/04 |
| | | | | 704/200 |
| 2023/0224981 | A1* | 7/2023 | Kim | H04R 1/403 |
| 2024/0310851 | A1* | 9/2024 | Ebrahimi Afrouzi | |
| | | | | A47L 9/2873 |

FOREIGN PATENT DOCUMENTS

| | | |
|---|---|---|
| KR | 10-2019-0029237 A | 3/2019 |
| KR | 10-2019-0106943 A | 9/2019 |

\* cited by examiner

[FIG. 1]
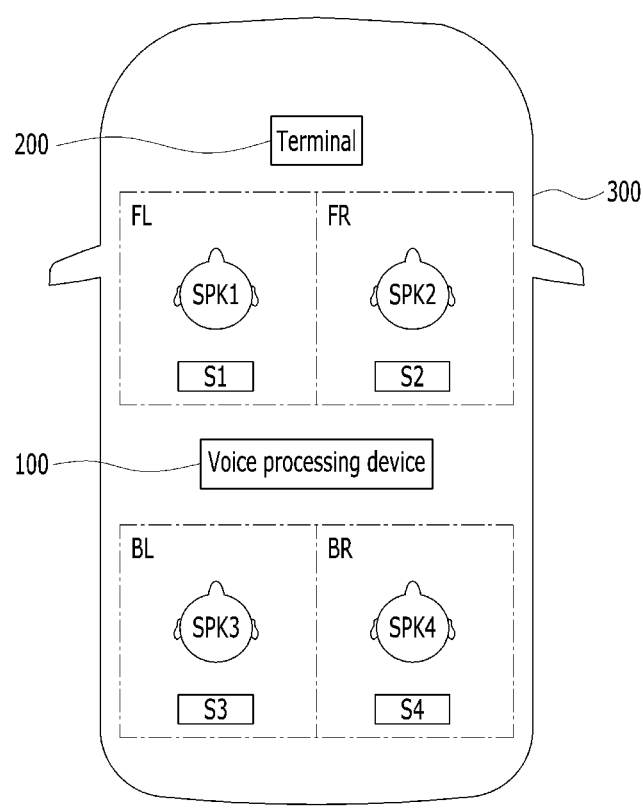

[FIG. 2]
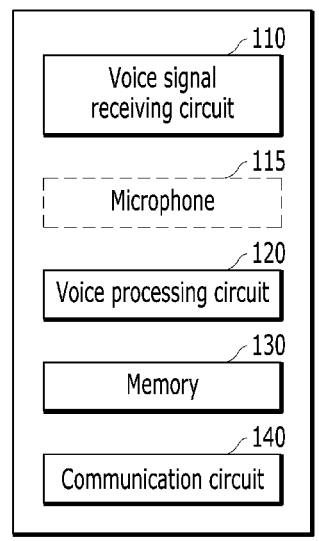
[FIG. 3]
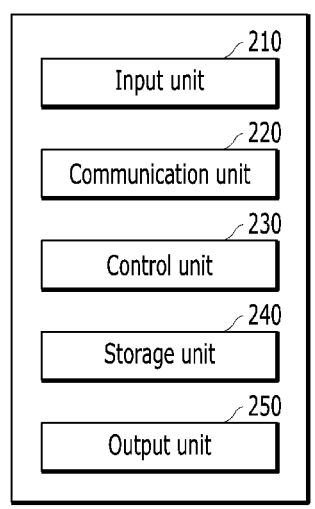

[FIG. 4]
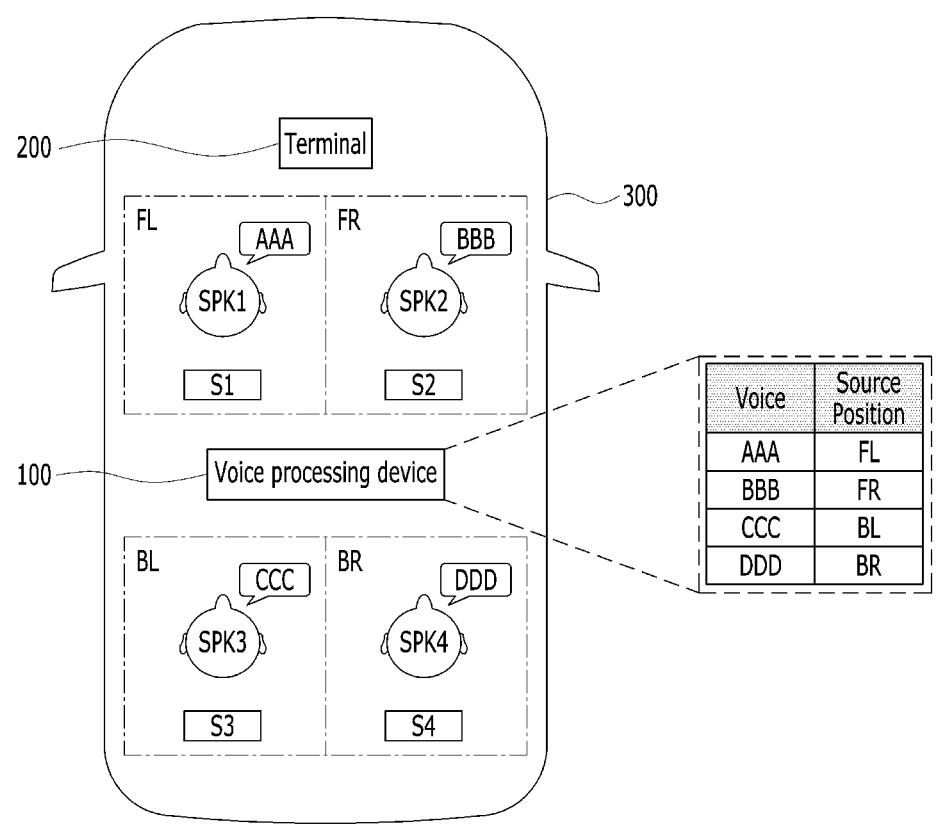

[FIG.5]
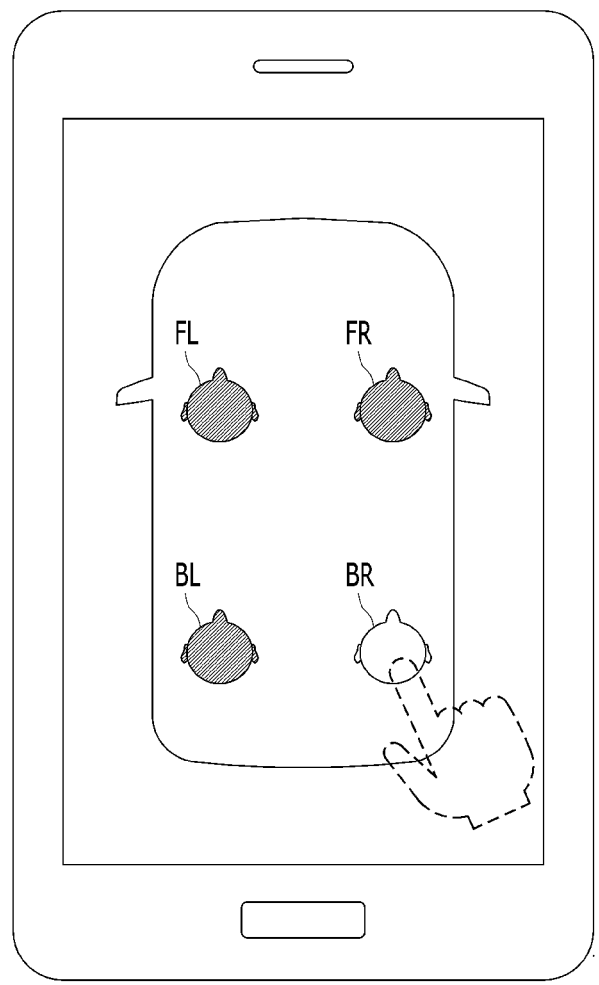

[FIG. 6]
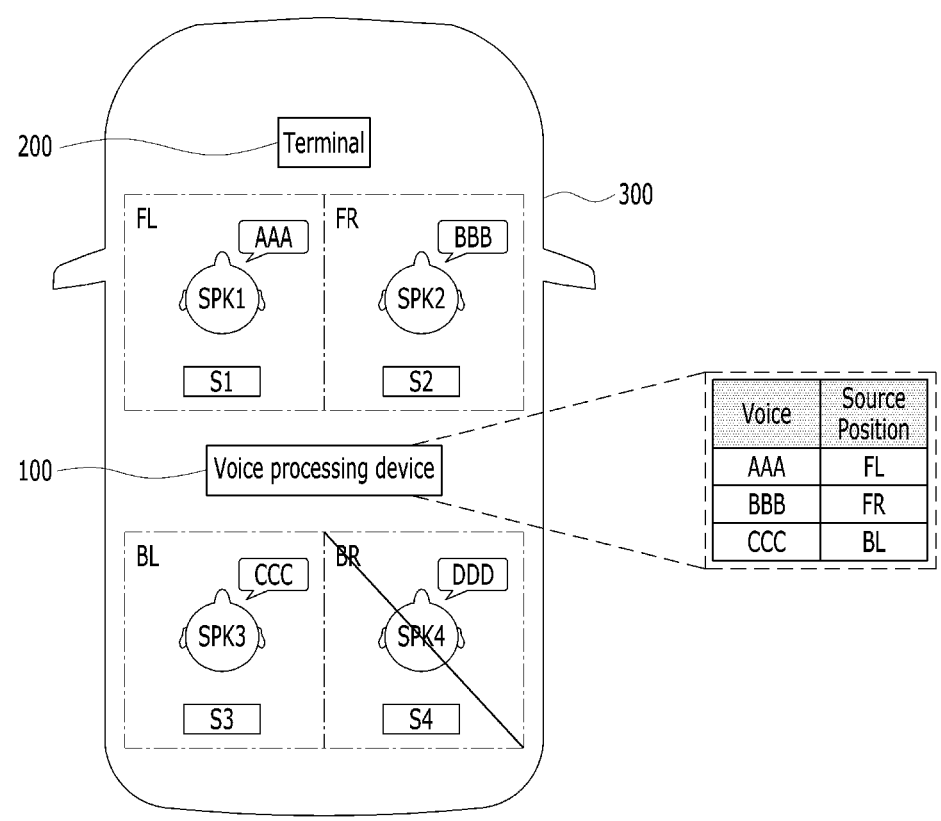

[FIG. 7]
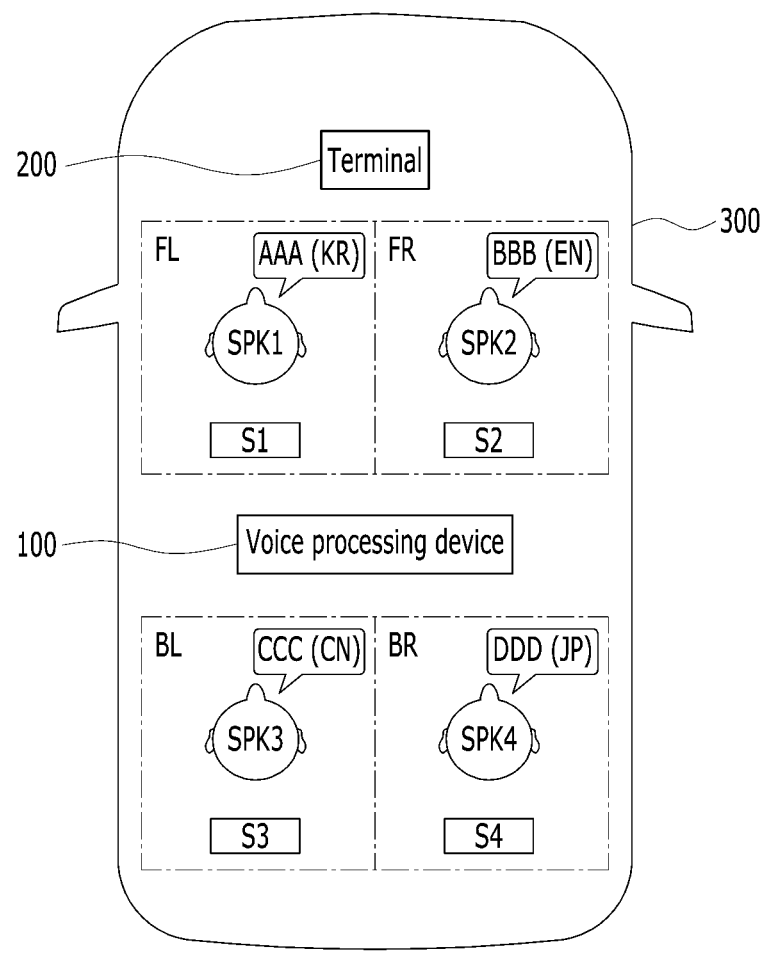

[FIG. 8]
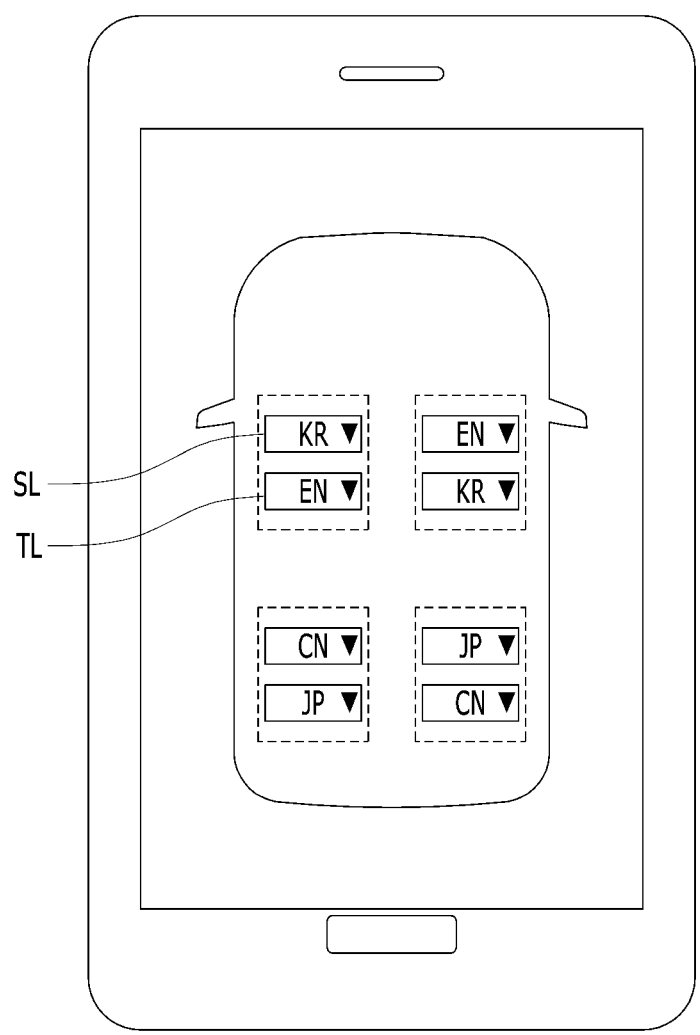

[FIG. 9]
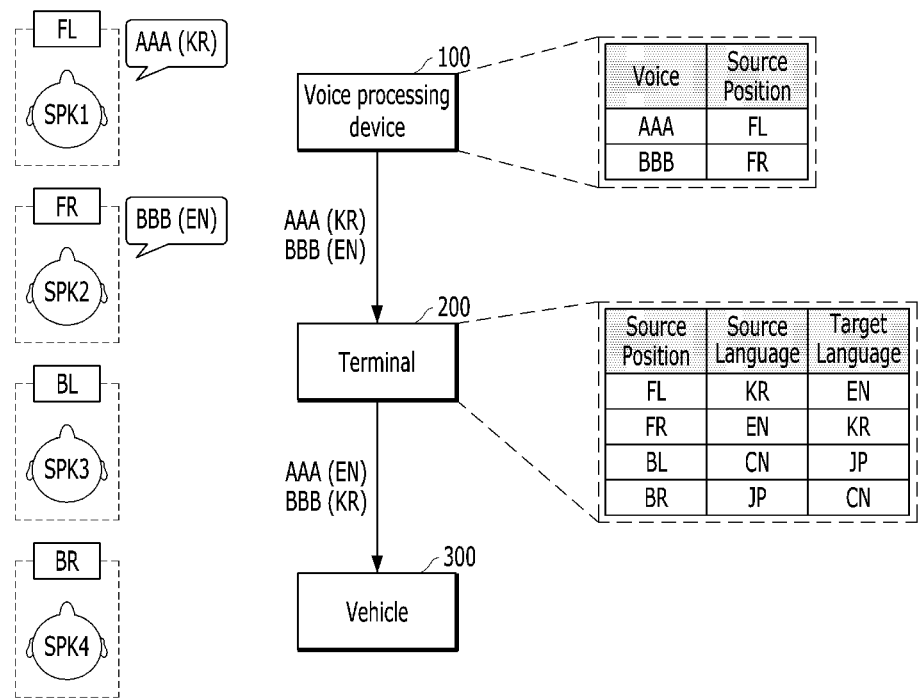

[FIG. 10]
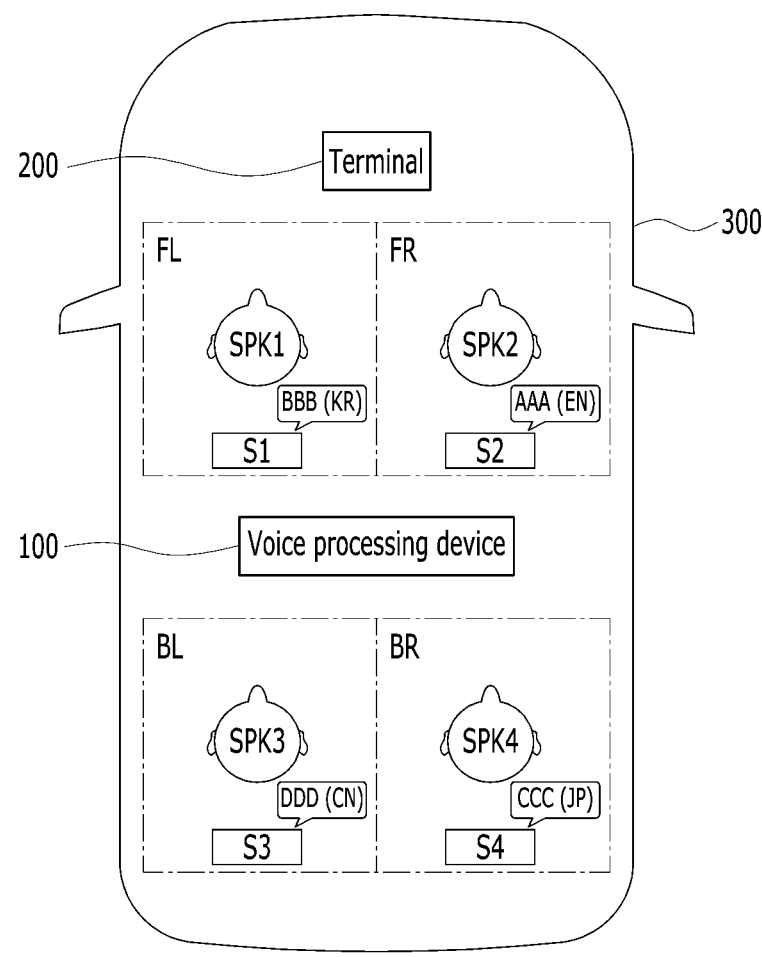

[FIG. 11]
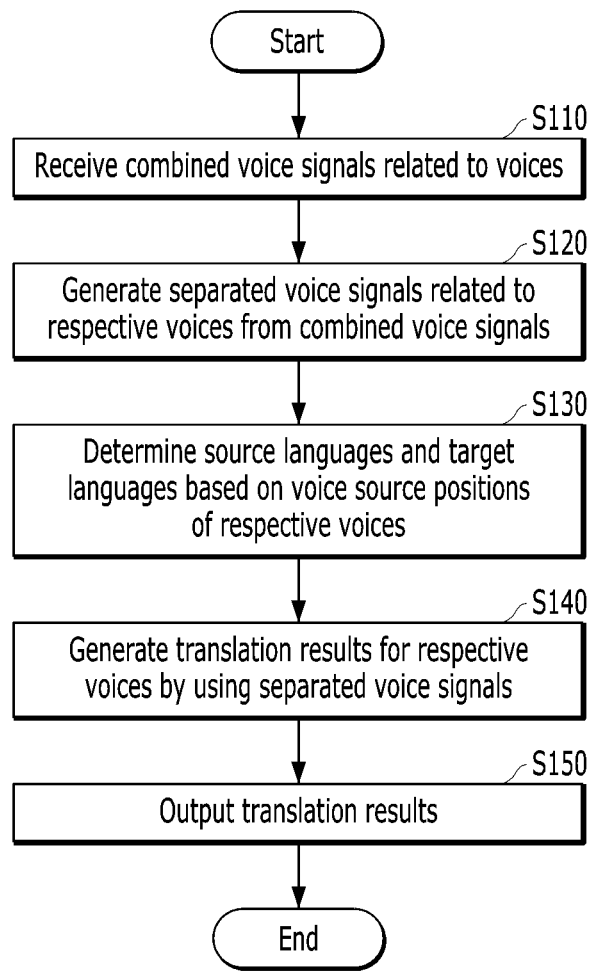

[FIG. 12]
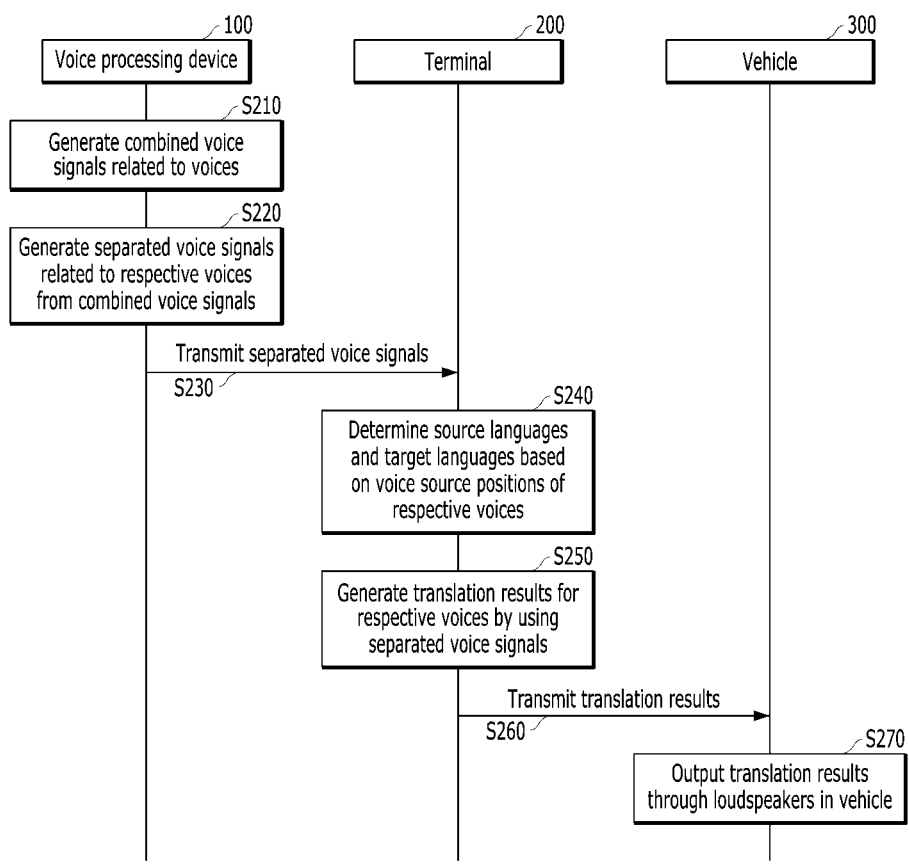

ABSTRACT

VOICE PROCESSING DEVICE AND OPERATING METHOD THEREFOR

TECHNICAL FIELD

Embodiments of the present disclosure relate to a voice processing device and an operating method thereof, and specifically, to a voice processing device mounted on a vehicle and an operating method thereof.

BACKGROUND ART

A microphone is a device which recognizes voice, and converts the recognized voice into a voice signal that is an electrical signal. In case that a microphone is disposed in a space in which a plurality of speakers are located, such as a meeting room or a classroom, the microphone receives all voices from the plurality of speakers, and generates voice signals related to the voices from the plurality of speakers.

In case that the plurality of speakers pronounce at the same time, it is required to separate the voice signals representing only the voices of the individual speakers. Further, in case that the plurality of speakers pronounce in different languages, in order to easily translate the voices of the plurality of speakers, it is required to grasp the original languages (i.e., source languages) of the voices of the plurality of speakers, and there are problems in that it requires a lot of time and resources to grasp the languages of the corresponding voices only with the features of the voices themselves.

SUMMARY OF INVENTION

Technical Problem

An object of the present disclosure is to provide a voice processing system, which can generate separated voice signals related to respective voices of speakers from the voices of the speakers in a vehicle.

Another object of the present disclosure is to provide a voice processing system, which can provide translations for voices of speakers in a vehicle by determining a source language and a target language corresponding to voice source positions of the respective voices of the speakers by using separated voice signals related to the respective voices of the speakers.

Solution to Problem

A voice processing device according to embodiments of the present disclosure includes: a voice processing circuit configured to: generate separated voice signals related to voices by performing voice source separation of voice signals related to the voices pronounced at a plurality of voice source positions in a vehicle based on the voice source positions of the voices, and output translation results for the voices based on the separated voice signals; a memory configured to store source language information representing source languages for translating the voices related to the separated voice signals and target language information representing target languages; and a communication circuit configured to output the translation results, wherein the voice processing circuit is configured to generate the translation results in which the languages of the voices corresponding to the separated voice signals are translated from the source languages into the target languages with reference to the memory.

A voice processing method according to embodiments of the present disclosure includes: performing voice source separation of voice signals related to voices pronounced at a plurality of voice source positions in a vehicle based on the voice source positions of the voices; generating separated voice signals related to the voices, respectively; storing source language information representing source languages for translating the voices related to the separated voice signals and target language information representing target languages; and outputting translation results in which languages of the voices corresponding to the separated voice signals are translated from the source languages into the target languages with respect to the voices based on the separated voice signals, the source language information, and the target language information.

Advantageous Effects of Invention

The voice processing device according to embodiments of the present disclosure has the effect of being able to generate the separated voice signals related to the voices of the respective speakers from the voice signals related to the voices of the speakers in the vehicle.

The voice processing device according to embodiments of the present disclosure has the effect of being able to determine the source languages for translating the voices and the target languages in accordance with the voice source positions of the voices of the speakers in the vehicle, and thus to provide the translations for the voices of the speakers with less time and few resources without the necessity of identifying in what languages the voices of the speakers are.

BRIEF DESCRIPTION OF DRAWINGS

FIG. 1 illustrates a voice processing system according to embodiments of the present disclosure.

FIG. 2 illustrates a voice processing device according to embodiments of the present disclosure.

FIG. 3 illustrates a terminal according to embodiments of the present disclosure.

FIG. 4 is a diagram explaining an operation of a voice processing device according to embodiments of the present disclosure.

FIGS. 5 and 6 are diagrams explaining control of a voice processing device by a terminal according to embodiments of the present disclosure.

FIGS. 7 to 9 are diagrams explaining a translation function of the voice processing system according to embodiments of the present disclosure.

FIG. 10 illustrates a voice processing device according to embodiments of the present disclosure and a vehicle.

FIG. 11 is a flowchart explaining an operation of a voice processing device according to embodiments of the present disclosure.

FIG. 12 is a data flowchart explaining an operation of the voice processing system according to embodiments of the present disclosure.

DESCRIPTION OF EMBODIMENTS

FIG. 1 illustrates a voice processing system according to embodiments of the present disclosure. Referring to FIG. 1, a voice processing system 10 may include a voice processing device 100, a terminal 200, and a vehicle 300.

The voice processing device 100 may be disposed in the vehicle 300, and perform voice processing for voices of respective speakers SPK1 to SPK4 in the vehicle 300. For example, the voice processing device 100 may generate separated voice signals corresponding to the voices of specific speakers based on the voice source positions of the received voices. For example, if a first speaker and a second speaker in the vehicle 300 pronounce the voices together, the voice processing device 100 may generate a first separated voice signal related to the voice of the first speaker and a second separated voice signal related to the voice of the second speaker.

The speakers SPK1 to SPK4 may be positioned in the vehicle 300, and pronounce specific voices. For example, the first speaker SPK1 may be positioned in a front row left area FL of the vehicle 300, the second speaker SPK2 may be positioned in a front row right area FR of the vehicle 300, the third speaker SPK3 may be positioned in a back row left area BL of the vehicle 300, and the fourth speaker SPK4 may be positioned in a back row right area BR of the vehicle 300, but embodiments of the present disclosure are not limited thereto.

The voice processing device 100 may process voice signals related to the voices pronounced by the speakers SPK1 to SPK4. The voice signals are signals related to the voices pronounced for a specific time, and may be signals representing the voices of the plurality of speakers.

According to embodiments, the voice processing device 100 may receive the voice signals related to the voices pronounced by the speakers SPK1 to SPK4, or may generate voice signals in response to the voices of the speakers SPK1 to SPK4.

The voice processing device 100 may extract (or generate) separated voice signals related to the voices of the speakers SPK1 to SPK4 by performing voice source separation. For example, the voice processing device 100 may generate the separated voice signals corresponding to the voices of the specific speakers based on the voice source positions of the received voices. For example, if the first speaker SPK1 and the second speaker SPK2 in the vehicle 300 pronounce the voices together, the voice processing device 100 may generate the first separated voice signal related to the voice of the first speaker SPK1 and the second separated voice signal related to the voice of the second speaker SPK2.

In this case, the first separated voice signal may be related to the voice of the first speaker among the speakers. In this case, for example, the first separated voice signal may have the highest correlation with the voice of the first speaker among the voices of the speakers. In other words, the voice component of the first speaker may have the highest proportion among voice components included in the first separated voice signal.

According to embodiments, the voice processing device 100 may determine the voice source positions of the voices of the speakers SPK1 to SPK4 by using a time delay (or phase delay) between the voice signals related to the voices of the speakers SPK1 to SPK4, and generate the separated voice signal corresponding to only the voice source at the specific position. For example, the voice processing device 100 may generate the separated voice signal related to the voice pronounced in a specific position (or direction). Accordingly, the voice processing device 100 may generate the separated voice signals related to the voices of the respective speakers SPK1 to SPK4.

The voice processing device 100 may provide translations for the voices of the speakers SPK1 to SPK4. For example, the voice processing device 100 may determine source languages (translation target languages) for translating the voices of the respective speakers SPK1 to SPK4 and target languages (languages after translation), and provide the translations for the languages of the respective speakers by using the separated voice signals.

According to embodiments, the voice processing device 100 may output translation results for the voices. The translation results may be text data or voice signals related to the voices of the speakers SPK1 to SPK4 expressed in the target languages.

That is, since the voice processing device 100 according to embodiments of the present disclosure determines the source languages and the target languages in accordance with the voice source positions of the voices of the speakers SPK1 to SPK4, it has the effect of being able to provide the translations for the voices of the speakers with less time and few resources without the necessity of identifying in what languages the voices of the speakers are.

The voice processing device 100 may communicate with the terminal 200 and the vehicle 300. According to embodiments, the voice processing device 100 may transmit the separated voice signals to the terminal 200 and the vehicle 300.

Further, the voice processing device 100 may recognize a trigger word from the pronounced voice, and transmit an operation command corresponding to the recognized trigger word to the vehicle 300.

The terminal 200 may be a device having an arithmetic processing function. According to embodiments, the terminal 200 may receive an input of data, process the input data, and output the processed data. For example, the terminal 200 may be an in-car entertainment device, a navigation terminal, a smart phone, a personal digital assistance (PDA), a personal computer (PC), a notebook computer, a wearable device, or a smart watch, but embodiments of the present disclosure is not limited thereto.

The terminal 200 may include an input device, such as a touch panel, buttons, or a microphone, a processor having an arithmetic processing function, a display, or an output device, such as a loudspeaker.

The terminal 200 may execute at least one application stored in the terminal 200, and perform a specific operation in accordance with the execution of the application.

For example, the terminal 200 may load an artificial intelligent (AI) speaker application, recognize at least one word included in the separated voice signal in accordance with the execution of the AI speaker application, and perform an operation corresponding to the recognized word. For example, if a word called "weather" is included in the separated voice signal, the terminal 200 may generate information on the current weather, or receive information on the weather from a cloud server (not illustrated).

For example, the terminal 200 may load a vehicle control application, recognize at least one word included in the separated voice signal in accordance with the execution of the vehicle control application, and generate a control command corresponding to the recognized word. The generated control command may be transmitted to the vehicle 300 (or a controller of the vehicle 300).

For example, the terminal 200 may load a translation application, and generate and output the translation results for the voices of the respective speakers SPK1 to SPK4 by using the separated voice signals in accordance with the execution of the translation application.

The terminal 200 may perform data communication with the voice processing device 100. According to embodiments, the terminal 200 may receive the separated voice signals from the voice processing device 100 in accordance with a wireless communication method or a wired communication method.

For example, the terminal 200 may recognize a trigger word from the separated voice signal, and transmit an operation command corresponding to the trigger word to the vehicle 300.

For example, the terminal 200 may display a control screen for controlling the voice processing device 100, generate control values for controlling the voice processing device 100 in accordance with a user input, and transmit the control values to the voice processing device 100.

The vehicle 300 may be defined as a transportation or conveyance means that runs on the road, seaway, railway, or airway, such as an automobile, train, motorcycle, ship, or aircraft. According to embodiments, the vehicle 300 may be a concept that includes all of an internal combustion engine vehicle having an engine as the power source, a hybrid vehicle having an engine and an electric motor as the power source, and an electric vehicle having an electric motor as the power source.

The vehicle 300 may receive the voice signals from the voice processing device 100 or the terminal 200, and output (or reproduce) the voice signals. Further, the vehicle 300 may perform a specific operation in accordance with the operation command transmitted from the voice processing device 100 or the terminal 200.

The vehicle 300 may receive the voice signals from the voice processing device 100, and output (or reproduce) the voice signals. Further, the vehicle 300 may perform the specific operation in accordance with the operation command transmitted from the voice processing device 100.

Further, the vehicle 300 may include a plurality of loudspeakers S1 to S4. The plurality of loudspeakers S1 to S4 may be devices capable of reproducing voices or music. For example, the plurality of loudspeakers S1 to S4 may be disposed on respective seats in the vehicle 300, but embodiments of the present disclosure are not limited thereto. The loudspeakers S1 to S4 may receive the voice signals, and output voices corresponding to the voice signals. According to embodiments, the loudspeakers S1 to S4 may generate vibrations based on the voice signals, and the voices may be reproduced in accordance with the vibrations of the loudspeakers S1 to S4.

According to embodiments, the loudspeakers S1 to S4 may be disposed at respective positions of the speakers SPK1 to SPK4. For example, the loudspeakers S1 to S4 may be loudspeakers disposed on headrests of the seats on which the speakers SPK1 to SPK4 are positioned, but embodiments of the present disclosure are not limited thereto.

FIG. 2 illustrates a voice processing device according to embodiments of the present disclosure. Referring to FIG. 2, the voice processing device 100 may include a voice signal receiving circuit 110, a voice processing circuit 120, a memory 130, and a communication circuit 140.

The voice signal receiving circuit 110 may receive the voice signals corresponding to the voices of the speakers SPK1 to SPK4. According to embodiments, the voice signal receiving circuit 110 may receive the voice signals in accordance with the wired communication method or the wireless communication method. The voice signals received by the voice signal receiving circuit 110 may be signals related to the voices of the plurality of speakers. For example, in case that the first speaker SPK1 and the second speaker SPK2 pronounce as overlapping each other in time, the voices of the first speaker SPK1 and the second speaker SPK2 overlap each other.

Alternatively, the voice processing device 100 may include microphones 115. In this case, the voice processing device 100 may not include the voice signal receiving circuit 110.

The microphones 115 may receive the voices of the speakers SPK1 to SPK4, and generate (combined) voice signals related to the voices of the speakers SPK1 to SPK4.

According to embodiments, the voice processing device 100 may include the plurality of microphones 115 arranged in the form of an array, and the plurality of microphones 115 may measure a pressure change of a medium (e.g., air) caused by the voices, convert the measured pressure change of the medium into voice signals that are electrical signals, and output the voice signals. Hereinafter, in the description, explanation will be made under the assumption that the plurality of microphones 115 are provided.

The voice signals generated by the microphones 115 may correspond to the voices of at least one speaker SPK1 to SPK4. For example, in case that the speakers SPK1 to SPK4 pronounce the voices at the same time, the voice signals generated by the respective microphones 115 may be signals representing the voices of all the speakers SPK1 to SPK4.

The microphones 115 may be composed of beamforming microphones, and may multi-directionally receive the input voices. According to embodiments, the microphones 115 may be disposed to be spaced apart from each other to constitute one microphone array, but embodiments of the present disclosure are not limited thereto.

The voice processing circuit 120 may process the voice signals. According to embodiments, the voice processing circuit 120 may include a processor having an arithmetic processing function. For example, the voice processing circuit 120 may perform analog-to-digital conversion of the voice signals received by the voice signal receiving circuit 110, and process the digital-converted voice signals.

The voice processing circuit 120 may extract (or generate) the separated voice signals related to the voices of the speakers SPK1 to SPK4 by using the voice signals.

The voice processing circuit 120 may determine voice source positions (i.e., positions of the speakers SPK1 to SPK4) of the voice signals by using the time delay (or phase delay) between the voice signals. For example, the voice processing circuit 120 may generate voice source position information representing the voice source positions (i.e., positions of the speakers SPK1 to SPK4) of the voice signals.

The voice processing circuit 120 may generate the separated voice signals related to the voices of the speakers SPK1 to SPK4 from the voice signals based on the determined voice source positions. For example, the voice processing circuit 120 may generate the separated voice signals related to the voices pronounced at specific positions (or directions).

In this case, the voice processing circuit 120 may grasp the voice source positions of the voices of the first speaker SPK1 and the second speaker SPK2 by using the voice signals, and generate a first separated voice signal related to the voice of the first speaker SPK1 and a second separated voice signal representing the voice of the second speaker SPK2 based on the voice source positions.

According to embodiments, the voice processing circuit 120 may match and store the separated voice signals with the voice source position information. For example, the voice processing circuit 120 may match and store the first separated voice signal related to the voice of the first speaker SPK1 with first voice source position information representing the voice source position of the voice of the first speaker SPK1.

The memory 130 may store data required to operate the voice processing device 100. According to embodiments, the memory 130 may store the separated voice signals and the voice source position information.

The communication circuit 140 may transmit data to the vehicle 300 (e.g., terminal 200), or receive data from the vehicle 300. According to embodiments, the communication circuit 140 may communicate data in accordance with the wireless communication method, but embodiments of the present disclosure are not limited thereto. For example, the communication circuit 140 may support the communication methods, such as WiFi, Bluetooth, Zigbee, NFC, Wibro, WCDMA, 3G, LTE, and 5G.

The communication circuit 140 may transmit the separated voice signals to the vehicle 300 under the control of the voice processing circuit 120. According to embodiments, the communication circuit 140 may transmit the voice source position information together with the separated voice signals.

According to embodiments, the voice processing device 100 may further selectively include a loudspeaker 150. The loudspeaker 150 may output the voices corresponding to the (combined or separated) voice signals under the control of the voice processing circuit 120.

FIG. 3 illustrates a terminal according to embodiments of the present disclosure. Referring to FIG. 3, the terminal 200 may include an input unit 210, a communication unit 220, a control unit 230, a storage unit 240, and an output unit 250.

The input unit 210 may detect a user's input (e.g., push, touch, click, or the like), and generate a detection signal. For example, the input unit 210 may be a touch panel or a keyboard, but is not limited thereto.

The communication unit 220 may perform communication with an external device (e.g., 100 or 300). According to embodiments, the communication unit 220 may receive the separated voice signals from the voice processing device 100. Further, according to embodiments, the communication unit 220 may transmit the translated separated voice signals to the vehicle 300.

The control unit 230 may control the overall operation of the terminal 200. According to embodiments, the control unit 230 may load a program (or application) stored in the storage unit 240, and perform an operation of the corresponding program in accordance with the loading.

For example, the control unit 230 may load a translation application, translate the separated voice signals corresponding to the voices of the respective speakers from source languages to target languages in accordance with an execution of the translation application, and generate the translation results.

For example, the control unit 230 may load an artificial intelligent (AI) speaker application, recognize at least one word included in the separated voice signal in accordance with the execution of the AI speaker application, and perform an operation corresponding to the recognized word. For example, if a word called "weather" is included in the separated voice signal, the control unit 230 may generate information on the current weather, or receive information on the weather from a cloud server (not illustrated).

For example, the control unit 230 may load a vehicle control application, recognize at least one word included in the separated voice signal in accordance with the execution of the vehicle control application, and generate a control command corresponding to the recognized word. The generated control command may be transmitted to the vehicle 300.

Further, the control unit 230 may control the operation of the voice processing device 100. According to embodiments, the control unit 230 may transmit control data related to the operation of the voice processing device 100 to the voice processing device 100.

The storage unit 240 may store data required to operate the terminal 200. According to embodiments, the storage unit 240 may store setting values and applications required to operate the terminal 200. For example, the storage unit 240 may store information on source languages and target languages for translating the voices of the speakers SPK1 to SPK4.

The output unit 250 may output the operation result of the terminal 200 and data generated by the terminal 200 visually, audibly, and tactilely. For example, the output unit 250 may be a display device, a loudspeaker, and a haptic device, but is not limited thereto.

FIG. 4 is a diagram explaining an operation of a voice processing device according to embodiments of the present disclosure. Referring to FIG. 4, speakers SPK1 to SPK4 positioned in the vehicle 300 may pronounce voices. The voice processing device 100 may receive the voices of the speakers SPK1 to SPK4, and generate the separated voice signals related to the voices of the speakers SPK1 to SPK4.

As illustrated in FIG. 4, the first speaker SPK1 pronounces voice "AAA", the second speaker SPK2 pronounces voice "BBB", the third speaker SPK3 pronounces voice "CCC", and the fourth speaker SPK4 pronounces voice "DDD".

The voice processing device 100 may generate the voice signals in response to the voices "AAA", "BBB", "CCC", and "DDD". Further, the voice processing device 100 may generate the separated voice signals related to the voices of the speakers SPK1 to SPK4 by using the voice signals.

For example, the voice processing device 100 may generate the first separated voice signal related to the voice "AAA" of the first speaker SPK1 by separating the voice signal in accordance with the positions of the voice source. Further, the voice processing device 100 may store the first voice source position information representing the front row left area (FL) that is the voice source position of the voice "AAA" (i.e., the position of the first speaker SPK1). In the same manner, the voice processing device 100 may generate the second separated voice signal related to the voice "BBB" of the second speaker SPK2, and store the second voice source position information representing the front row right area (FR) that is the position of the voice "BBB" (i.e., the position of the second speaker SPK2).

FIGS. 5 and 6 are diagrams explaining control of a voice processing device by a terminal according to embodiments of the present disclosure. Referring to FIGS. 5 and 6, the terminal 200 may control the operation of the voice processing device 100. According to embodiments, the terminal 200 may configure the voice source position of the voice to be extracted (or separated) by the voice processing device 100. For example, the terminal 200 may activate or deactivate the voice separation function that is performed by the voice processing device 100 for respective positions FL, FR, BL, and BR in the vehicle 300.

For example, as illustrated in FIG. 5, a user may deactivate the voice separation function for the back row right area BR by touching the screen displayed on the terminal 200. The terminal 200 may transmit, to the voice processing device 100, control data indicating deactivation of the voice separation function for the voice of which the voice source position is the back row right area BR.

Under the control from the terminal 200, the voice processing device 100 may deactivate the separation of the voice signal of the voice having the voice source position of the back row right area BR from the voice signals. That is, in other words, the voice processing device 100 may deactivate the separation of the voice signal of the voice of the fourth speaker SPK4 positioned in the back row right area BR.

For example, as illustrated in FIG. 6, the voice processing device 100 may generate the first separated voice signal related to the voice "AAA" of the first speaker SPK1, the second separated voice signal related to the voice "BBB" of the second speaker SPK2, and the third separated voice signal related to the voice "CCC" of the third speaker SPK3 from the voice signals corresponding to the voices "AAA", "BBB", "CCC", and "DDD" of the speakers SPK1 to SPK4, but may not generate the fourth separated voice signal related to the voice "DDD" of the fourth speaker SPK4.

That is, under the control from the terminal 200, if the separation of the voice signal of the voice having the voice source position of the back row right area BR from the voice signals is deactivated, the voice processing device 100 may not generate the separated voice signal corresponding to the voice of the fourth speaker SPK4 from the voice signals.

FIGS. 7 to 9 are diagrams explaining a translation function of the voice processing system according to embodiments of the present disclosure. Referring to FIGS. 7 to 9, the voice processing device 100 may generate the separated voice signals related to the voices of the speakers SPK1 to SPK4, and output the translation results for the voices of the speakers SPK1 to SPK4 by using the separated voice signals.

As illustrated in FIG. 7, the first speaker SPK1 pronounces the voice "AAA" in Korean (KR), the second speaker SPK2 pronounces the voice "BBB" in English (EN), the third speaker SPK3 pronounces the voice "CCC" in Chinese (CN), and the fourth speaker SPK4 pronounces the voice "DDD" in Japanese (JP). In this case, the source language of the voice "AAA" of the first speaker SPK1 is Korean (KR), the source language of the voice "BBB" of the second speaker SPK2 is English (EN), the source language of the voice "CCC" of the third speaker SPK3 is Chinese (CN), and the source language of the voice "DDD" of the fourth speaker SPK4 is Japanese (JP).

As described above, the voice processing device 100 may generate the separated voice signals related to the voices of the speakers SPK1 to SPK4 by using the voice signals corresponding to the voices of the speakers SPK1 to SPK4. For example, the voice processing device 100 may generate the first separated voice signal related to the voice "AAA (KR)" of the first speaker SPK1.

The voice processing device 100 according to embodiments of the present disclosure may provide translations for the voices of the speakers SPK1 to SPK4 by using the separated voice signals related to the voices of the speakers SPK1 to SPK4. For example, the voice processing device 100 may provide the translation for the voice "AAA (KR)" pronounced by the first speaker SPK1.

Referring to FIG. 8, the voice processing device 100 may provide the translations from the source languages to the target languages for the languages of the voices of the speakers SPK1 to SPK4 based on the source languages SL and the target languages TL determined in accordance with the voice source positions.

The source languages SL and the target languages TL may be configured in accordance with the operation of the terminal 200. According to embodiments, the terminal 200 may generate values for configuring the source languages SL and the target languages TL required to translate the voices of the speakers SPK1 to SPK4.

For example, as illustrated in FIG. 9, the terminal 200 may configure the source languages SL and the target languages corresponding to the positions (or speakers) in the vehicle 300, and transmit the values related to the configuration to the voice processing device 100.

For example, the user may configure Korean (KR) as the source language for the front row right position (e.g., first speaker SPK1), and configure English (EN) as the target language by using the input unit (e.g., touch panel) of the terminal 200. In response to the user input, the terminal 200 may generate and store first source language information indicating that the source language for the front row right position (i.e., first speaker SPK1) is Korean (KR) and first target language information indicating that the target language for the front row right position (i.e., first speaker SPK1) is English (EN). In the same manner, the terminal 200 may store the source language information for the remaining positions in the vehicle 300 and the target language information.

The terminal 200 may transmit the generated source language information and target language information to the voice processing device 100.

Meanwhile, according to embodiments, the source language information and the target language information may be stored in the voice processing device 100 in advance.

As illustrated in FIG. 9, the voice processing device 100 may output the translation results for the voices of the speakers SPK1 to SPK4 by using the source language information and the target language information corresponding to the voice source positions.

The voice processing device 100 may generate and store the separated voice signals corresponding to the voices of the speakers SPK1 to SPK4 and the voice source position information representing the voice source positions of the voices. For example, the voice processing device 100 may store the separated voice signal related to the voice "AAA (KR)" of the first speaker SPK1 and the voice source position information representing the "FL" that is the voice source position of the voice "AAA" in response to the voice "AAA (KR)" of the first speaker SPK1 and the voice "BBB (EN)" of the second speaker SPK2. In the same manner, the voice processing device 100 may store the separated voice signal related to the voice "BBB" of the second speaker SPK2 and the voice source position information representing the "FR" that is the voice source position of the voice "BBB".

The voice processing device 100 may determine the source languages and the target languages for translating the voices of the speakers SPK1 to SPK4 based on the voice source position information corresponding to the voice source positions of the separated voice signals. According to embodiments, the voice processing device 100 may determine the source languages and the target languages for translating the voices of the speakers SPK1 to SPK4 by reading the source language information and the target language information corresponding to the voice source positions by using the voice source position information.

For example, the voice processing device 100 receives the first voice source position information representing the front row left position (FL) that is the voice source position of the voice "AAA (KR)" of the first speaker SPK1. The terminal 200 may read the source language information and the target language information corresponding to the front row left position (FL) from the memory 130 by using the first voice source position information. The read source language information indicates that the source language is Korean (KR), and the target source language information indicates that the target language is English (EN).

The voice processing device 100 may provide the translations for the voices of the speakers SPK1 to SPK4 based on the determined source languages and target languages. For example, the voice processing device 100 may generate the "AAA (EN)" that is the translation result for the voice of the first speaker SPK1 that is expressed in English (EN) by using the separated voice signal related to the voice "AAA (KR)" of the first speaker SPK1 that is expressed in Korean (KR). In this case, the voice processing device 100 may output the translation result to the vehicle 300 or the terminal 200.

Further, for example, the voice processing device 100 may generate the "BBB (KR)" that is the translation result for the voice of the second speaker SPK2 that is expressed in Korean (KR) by using the separated voice signal related to the voice "BBB (EN)" of the second speaker SPK2 that is expressed in English (EN).

In the same manner, the voice processing device 100 may generate the translation results for the voice "CCC (CN)" of the third speaker SPK3 and the voice "DDD (JP)" of the fourth speaker SPK4.

In the description, the translation result that is output by the voice processing device 100 may be text data expressed in the target language or the voice signal related to the voice pronounced in the target language, but is not limited thereto.

The voice processing device 100 may generate the translation results in which the languages of the voices of the speakers SPK1 to SPK4 are translated from the target languages to the source languages by using the separated voice signals, and output the translation results.

In the description, the generation of the translation results by the voice processing device 100 includes not only generation of the translation results by translating the languages through an arithmetic operation of the voice processing circuit 120 of the voice processing device 100 but also generation of the translation results by receiving the translation results from a server having a translation function through communication between the voice processing device 100 and the server.

For example, the voice processing circuit 120 may generate the translation results for the voices of the speakers SPK1 to SPK4 by executing the translation application stored in the memory 130.

For example, the voice processing device 100 may transmit the separated voice signals, source language information, and target language information to translators, and receive the translation results for the separated voice signals from the translators. The translators may mean an environment or a system that provides the translations for the languages. According to embodiments, the translators may output the translation results for the voices of the speakers SPK1 to SPK4 by using the separated voice signals, the source language information, and the target language information.

The voice processing device 100 according to embodiments of the present disclosure may generate the separated voice signals related to the voices of the speakers SPK1 to SPK4 in the vehicle 300, determine the source languages and the target languages in accordance with the voice source positions of the voices of the speakers SPK1 to SPK4 by using the separated voice signals, and translate the voices of the speakers SPK1 to SPK4. Further, the voice processing device 100 may transmit the translation results to the vehicle 300.

FIG. 10 illustrates a voice processing device according to embodiments of the present disclosure and a vehicle. Referring to FIG. 10, the voice processing device 100 may translate the voices of the speakers SPK1 to SPK4, and transmit the translation results to the vehicle 300.

The translation results for the voices of the speakers SPK1 to SPK4 may be output through loudspeakers S1 to S4 in the vehicle 300. According to embodiments, the translation results for the voices of the speakers SPK1 to SPK4 may be output through the specific loudspeaker among the loudspeakers S1 to S4.

For example, the vehicle 300 may reproduce the translated voices by transmitting the voice signals related to the translated voices of the speakers SPK1 to SPK4 transmitted from the voice processing device 100 to the loudspeakers S1 to S4. Further, for example, the voice processing device 100 may transmit the voice signals related to the translated voices of the speakers SPK1 to SPK4 to the loudspeakers S1 to S4.

The voice processing device 100 may determine the positions of the loudspeakers S1 to S4 from which the translation results for the voices of the speakers SPK1 to SPK4 are output. According to embodiments, the voice processing device 100 may generate the output position information representing the positions of the loudspeakers from which the translation results are output.

For example, the translation results for the voices of the speakers positioned in a first row (e.g., front row) of the vehicle 300 may be output from the loudspeakers disposed in the first row (e.g., front row) that is the same row.

For example, the voice processing device 100 may generate the output position information so that the target languages corresponding to the voice source positions of the voices to be translated and the source languages corresponding to the positions of the loudspeakers from which the translation results are to be output are the same based on the source language information and the target language information for the voice source positions of the voices of the speakers SPK1 to SPK4.

However, a method for determining the positions of the loudspeakers from which the translation results are to be output is not limited to the above method.

In accordance with the output position information, the translation results for the voices of the speakers SPK1 to SPK4 may be output from the corresponding loudspeakers among the loudspeakers S1 to S4.

According to embodiments, the voice processing device 100 may transmit, to the vehicle 300, the output position information representing the positions of the loudspeaker from which the corresponding translation results are to be output together with the translation results, and the vehicle 300 may determine the loudspeakers from which the translation results for the corresponding voices are to be output among the loudspeakers S1 to S4 by using the output position information, and transmit the voice signals related to the translated voices to be output from the determined loudspeakers.

Further, according to embodiments, the voice processing device 100 may determine the loudspeakers to output the translation results of the corresponding voices among the loudspeakers S1 to S4 by using the output position information, and transmit the voice signals related to the translated voices to be output from the determined loudspeakers.

For example, in FIGS. 9 and 10, since the target language at the front row left position and the source language at the front row right position are English (EN), the translation result "AAA (EN)" for the voice at the front row left position may be output from the loudspeaker S2 positioned at the front row right. In the same manner, the translation result "BBB (KR)" for the voice may be output from the loudspeaker S1 positioned at the front row left.

FIG. 11 is a flowchart explaining an operation of a voice processing device according to embodiments of the present disclosure. Referring to FIG. 11, the voice processing device 100 may generate the separated voice signals related to the voices of the speakers SPK1 to SPK4 from the voice signals (S110). According to embodiments, the voice processing device 100 may receive the voice signals related to the voices of the speakers SPK1 to SPK4, and extract or separate the separated voice signals from the voice signals.

The voice processing device 100 may determine the source languages and the target languages for the voices of the speakers SPK1 to SPK4 (S120). According to embodiments, the voice processing device 100 may refer to the memory 130, and may determine the source languages and the target languages for the separated voice signals by reading the source language information and the target language information corresponding to the voice source positions of the voices related to the separated voice signals.

The voice processing device 100 may generate the translation results for the voices of the speakers SPK1 to SPK4 by using the separated voice signals (S130). According to embodiments, the voice processing device 100 may generate the translation results through a self-translation algorithm stored in the voice processing device 100, or may transmit the separated voice signals and the target language and source language information to the communicable translators, and receive the translation results from the translators.

The voice processing device 100 may output the translation results (S140). According to embodiments, the translation results generated by the voice processing device 100 may be output through the loudspeakers S1 to S4 in the vehicle 300.

For example, the voice processing device 100 may transmit the translation results to the vehicle 300, and the vehicle 300 may output the translation results through the loudspeakers S1 to S4.

For example, the voice processing device 100 may output the translation results through the loudspeakers S1 to S4 by transmitting the translation results to the loudspeakers S1 to S4 in the vehicle 300.

According to embodiments, the voice processing device 100 may determine the loudspeakers from which the translation results are to be output among the loudspeakers S1 to S4 with respect to the translation results for the voices of the speakers SPK1 to SPK4. For example, the translation result for the voice of the first speaker SPK1 may be output through the loudspeaker adjacent to the second speaker SPK2, but embodiments of the present disclosure are not limited thereto.

The voice processing system according to embodiments of the present disclosure may generate the separated voice signals related to the voices of the speakers SPK1 to SPK4 in the vehicle 300, determine the source languages and the target languages in accordance with the voice source positions of the voices of the speakers SPK1 to SPK4 by using the separated voice signals, and translate the voices of the speakers SPK1 to SPK4. Further, the voice processing system may output the translated voices of the speakers SPK1 to SPK4 through the loudspeakers at desired positions in the vehicle 300.

FIG. 12 is a data flowchart explaining an operation of a voice processing system according to embodiments of the present disclosure. When compared with FIG. 11, there is a difference in that the voice processing device 100 transmits the separated voice signals to the terminal 200 instead of directly generating the translation results, and the terminal 200 generates the translation results by using the separated voice signals.

Referring to FIG. 12, the voice processing device 100 may generate the voice signals related to the voices of the speakers SPK1 to SPK4 in response to the voices of the speakers SPK1 to SPK4 in the vehicle 300 (S210). According to embodiments, the voice processing device 100 may include a plurality of microphones, and the plurality of microphones may generate the voice signals related to the voices of the speakers SPK1 to SPK4.

The voice processing device 100 may generate the separated voice signals related to the voices of the speakers SPK1 to SPK4 (S220). According to embodiments, the voice processing device 100 may generate the separated voice signals related to the voices of the speakers SPK1 to SPK4 through the voice source separation.

The voice processing device 100 may transmit the separated voice signals (S230). According to embodiments, the voice processing device 100 may transmit the separated voice signals to the terminal 200 in accordance with the wireless communication method. Further, the voice processing device 100 may transmit the separated voice signals and the voice source position information representing the voice source positions of the voices related to the separated voice signals together.

The terminal 200 may determine the source languages and the target languages for the voices of the speakers SPK1 to SPK4 (S240). According to embodiments, the terminal 200 may determine the source languages and the target languages for the separated voice signals by reading the source language information and the target language information corresponding to the voice source positions of the voices related to the separated voice signals with reference to the storage unit 240.

The terminal 200 may generate the translation results for the voices of the speakers SPK1 to SPK4 by using the separated voice signals (S250). According to embodiments, the terminal 200 may generate the translation results through the self-translation algorithm stored in the terminal 200, or may transmit the separated voice signals and the target language and source language information to the communicable translators, and receive the translation results from the translators.

In the description, the translation result that is output by the terminal 200 may be text data expressed in the target language or the voice signal related to the voice pronounced in the target language, but is not limited thereto.

In the description, the generation of the translation results by the terminal 200 or the control unit 230 includes not only generation of the translation results by translating the languages through the arithmetic operation of the terminal 200 or the control unit 230 itself but also generation of the translation results by the terminal 200 by receiving the translation results from the server having the translation function through communication of the terminal 200 with the server.

For example, the control unit 230 of the terminal 200 may generate the translation results for the voices of the speakers SPK1 to SPK4 by executing the translation application stored in the storage unit 240.

For example, the terminal 200 may receive the separated voice signals related to the voices of the speakers SPK1 to SPK4 from the voice processing device 100, transmit the separated voice signals, source language information, and target language information to the translators, and receive the translation results for the separated voice signals from the translators. The translators may mean an environment or a system that provides the translations for the languages. According to embodiments, the translators may receive the separated voice signals related to the voices of the speakers SPK1 to SPK4, source language information, and target language information from the terminal 200, and output the translation results for the voices of the speakers SPK1 to SPK4.

The terminal 200 may output the translation results (S260). According to embodiments, the terminal 200 may transmit the translation results to the vehicle 300.

The vehicle 300 may receive the translation results transmitted from the terminal 200, and output the translation results through the loudspeakers installed in the vehicle 300. According to embodiments, the vehicle 300 may output the voices of the speakers SPK1 to SPK4 being expressed in the target languages through the loudspeakers by using the translation results.

The voice processing system according to embodiments of the present disclosure may generate the separated voice signals related to the voices of the speakers SPK1 to SPK4 in the vehicle 300, determine the source languages and the target languages in accordance with the voice source positions of the voices of the speakers SPK1 to SPK4 by using the separated voice signals, and translate the voices of the speakers SPK1 to SPK4. Further, the voice processing system may output the translated voices of the speakers SPK1 to SPK4 through the loudspeakers at the desired positions in the vehicle 300.

As described above, although embodiments have been described by the limited embodiments and drawings, those of ordinary skill in the corresponding technical field can make various corrections and modifications from the above description. For example, proper results can be achieved even if the described technologies are performed in a different order from that of the described method, and/or the described constituent elements, such as the system, structure, device, and circuit, are combined or assembled in a different form from that of the described method, or replaced by or substituted with other constituent elements or equivalents.

Accordingly, other implementations, other embodiments, and equivalents to the claims belong to the scope of the claims to be described later.

INDUSTRIAL APPLICABILITY

Embodiments of the present disclosure relate to a voice processing device and an operating method thereof.

The invention claimed is:

1. A voice processing device comprising:
   a voice processing circuit configured to: generate separated voice signals related to voices by performing voice source separation of voice signals related to the voices pronounced at a plurality of voice source positions in a vehicle based on the voice source positions of the voices, and output translation results for the voices based on the separated voice signals;
   a memory configured to store source language information representing source languages for translating the voices related to the separated voice signals and target language information representing target languages; and
   a communication circuit configured to output the translation results,
   wherein the voice processing circuit is configured to generate the translation results in which the languages of the voices corresponding to the separated voice signals are translated from the source languages into the target languages with reference to the memory,
   wherein the communication circuit is configured to transmit the translation results to the vehicle in accordance with the control of the voice processing circuit, and
   wherein the transmitted translation results are output through loudspeakers of the vehicle as voices,
   wherein the voice processing circuit is configured to generate output position information representing positions of the loudspeakers to output the translation results in the vehicle, and transmit the generated output position information to the vehicle,
   wherein the voice processing circuit is configured to generate the output position information so that the target languages corresponding to the voice source positions of the voices related to the separated voice signals and the source languages corresponding to the positions of the loudspeakers are the same.

2. The voice processing device of claim 1, further comprising a voice receiving circuit configured to receive the voice signals.

3. The voice processing device of claim 1, comprising a plurality of microphones disposed to form an array,
   wherein the plurality of microphones are configured to generate the voice signals in response to the voices.

4. The voice processing device of claim 3, wherein the voice processing circuit is configured to:
   judge the voice source positions of the respective voices based on a time delay among a plurality of voice signals generated from the plurality of microphones, and
   generate the separated voice signals based on the determined voice source positions.

5. The voice processing device of claim 3, wherein the voice processing circuit is configured to generate voice source position information representing the voice source positions of the voices based on a time delay among a plurality of voice signals generated from the plurality of microphones, and match and store, in the memory, the voice source position information for the voices with the separated voice signals for the voices.

6. The voice processing device of claim 1, wherein the voice processing circuit is configured to determine the source languages for translating the voices related to the separated voice signals and the target language with reference to the source language information corresponding to the voice source positions of the separated voice signals stored in the memory and the target language information.

7. The voice processing device of claim 1, wherein the translation results are text data expressed in the target languages or voice signals related to voices pronounced in the target languages.

8. A voice processing method comprising:
   performing voice source separation of voice signals related to voices pronounced at a plurality of voice source positions in a vehicle based on the voice source positions of the voices;

generating separated voice signals related to the voices, respectively;

storing source language information representing source languages for translating the voices related to the separated voice signals and target language information representing target languages; and outputting translation results in which languages of the voices corresponding to the separated voice signals are translated from the source languages into the target languages with respect to the voices based on the separated voice signals, the source language information, and the target language information, wherein the communication circuit is configured to transmit the translation results to the vehicle in accordance with the control of the voice processing circuit, and wherein the transmitted translation results are output through loudspeakers of the vehicle as voices, wherein the voice processing circuit is configured to generate output position information representing positions of the loudspeakers to output the translation results in the vehicle, and transmit the generated output position information to the vehicle, wherein the voice processing circuit is configured to generate the output position information so that the target languages corresponding to the voice source positions of the voices related to the separated voice signals and the source languages corresponding to the positions of the loudspeakers are the same.

9. The voice processing method of claim 8, further comprising receiving the voice signals from a plurality of microphones disposed to form an array.

10. The voice processing method of claim 9, wherein the generating of the separated voice signals comprises:
judging voice source positions of the respective voices based on a time delay among the plurality of voice signals, and generating the separated voice signals based on the determined voice source positions.

11. The voice processing method of claim 9, further comprising:
generating voice source position information representing the voice source positions of the voices based on a time delay among the plurality of voice signals; and
matching and storing voice source position information for the voices with the separated voice signals for the voices.

* * * * *